United States Patent [19]
Nishii et al.

[11] Patent Number: 6,065,814
[45] Date of Patent: May 23, 2000

[54] BRAKE CONTROL DEVICE FOR VEHICLE

[75] Inventors: Michiharu Nishii; Masaki Oishi, both of Toyota, Japan

[73] Assignee: Aisin Seiki Kabushiki Kaisha, Kariya, Japan

[21] Appl. No.: 09/161,229

[22] Filed: Sep. 28, 1998

[51] Int. Cl.[7] ........................................... B60T 8/38
[52] U.S. Cl. ........................... 303/116.1; 303/DIG. 11; 138/31
[58] Field of Search ................ 303/DIG. 11, 10, 303/11, 116.4, 116.1, 116.2, DIG. 1, DIG. 2, DIG. 3, 87; 138/30, 31

[56] References Cited

U.S. PATENT DOCUMENTS

| 4,256,145 | 3/1981 | Phillips | 188/31 |
| 5,806,939 | 9/1998 | Feigel et al. | 303/DIG. 11 |

FOREIGN PATENT DOCUMENTS

| 3930557 | 3/1991 | Germany | 303/87 |

OTHER PUBLICATIONS

Kobe, "Modern Brake Through", *Automotive Industry*, Kelsey–Hayes Co., Sep. 1996, pp. 118–119.

*Primary Examiner*—Matthew C. Graham
*Attorney, Agent, or Firm*—Burns, Doane, Swecker & Mathis, LLP

[57] ABSTRACT

A vehicle brake control device includes a wheel cylinder mounted on a wheel of a vehicle, a master cylinder which generates a brake fluid pressure according to the amount of operation of the brake pedal and supplies the brake fluid pressure to the wheel cylinder, a pump which draws brake fluid out of a reservoir for generating a brake fluid pressure, and an accumulator which stores the brake fluid pressure generated by the pump. A change-over valve is disposed between the master cylinder and the wheel cylinder to disconnect the wheel cylinder from the master cylinder during its non-operational condition and to connect the wheel cylinder to the master cylinder during its operational condition A fluid conduit connects the accumulator to the wheel cylinder during the non-operational condition of the change-over valve, and a regulator is disposed on the fluid conduit to regulate the fluid pressure in the accumulator according to the amount of brake pedal operation. The accumulator includes a hollow case having an interior, a dividing member which divides the cylinder into a gas chamber which stores gas and a fluid chamber in which the brake fluid pressure generated by the pump is stored, and an open air chamber disposed on the dividing member.

16 Claims, 3 Drawing Sheets

BRAKE CONTROL DEVICE FOR VEHICLE

This application corresponds to and claims priority under 35 U.S.C. § 119 with respect to Japanese Patent Application No. 09 (1997)-262440 filed on Sep. 26, 1998, the entire content of which is incorporated herein by reference.

FIELD OF THE INVENTION

The present invention generally relates to vehicle brake systems. More particularly, the present invention pertains to a vehicle brake control device that is adapted to disconnect a wheel cylinder from a master cylinder and connect the wheel cylinder to an accumulator through a regulator during normal braking conditions.

BACKGROUND OF THE INVENTION

A conventional brake control device for a vehicle is described at pages 118–119 of the publication entitled "Automotive Industry" published by Kelsey-Hayes Co. in Sep., 1996. This conventional brake control device for a vehicle includes a normally closed type valve which is disposed between a master cylinder and a wheel cylinder, and an accumulator that is connected to the front wheel cylinders through an electric regulator and an auxiliary pressure generator. The electric regulator detects the amount of operation of the brake pedal and regulates the fluid pressure in the accumulator according to the detected amount of brake pedal operation.

The auxiliary pressure generator includes a piston that is slidably disposed in a cylinder. The cylinder is divided in a fluid-tight manner into a first pressure chamber connected to the regulator and a second pressure chamber connected to the wheel cylinder. A spring is disposed in the second pressure chamber and urges the piston in a manner that reduces the volume of the first pressure chamber. The piston slides in the cylinder to reduce the volume of the second pressure chamber by the regulated fluid pressure flowing into the first pressure chamber from the regulator. Therefore, the fluid pressure in the wheel cylinder is increased to apply a brake force to the wheel.

The accumulator includes a hollow case divided by a dividing member into a high pressure gas chamber and a fluid pressure chamber. In the accumulator used in the conventional vehicle brake control device, gas that is mixed in the brake fluid in the fluid pressure chamber (which is leaked from the high pressure gas chamber through the dividing member) is prevented from being mixed in the brake fluid in the wheel cylinder to thereby secure the application of the brake force to the wheel because the wheel cylinder is fluid-tightly cut off from the accumulator by the auxiliary pressure generator.

The conventional vehicle brake control device described above suffers from certain disadvantages and drawbacks. For example, because the conventional brake control device includes the auxiliary pressure generator disposed between the accumulator and the wheel cylinder, a large number of parts are required to form the vehicle brake control device. This undesirably increases the cost of the brake control device.

In light of the forgoing, a need exists for a vehicle brake control device that is able to prevent the gas in the accumulator from being mixed in the brake fluid in the wheel cylinder through a regulator.

A need also exists for a vehicle brake control device that is able to address the foregoing while at the same time being relatively low in cost.

SUMMARY OF THE INVENTION

The present invention provides a vehicle brake control device that includes a wheel cylinder mounted on a wheel of a vehicle, a master cylinder which generates a brake fluid pressure according to the amount of operation of the brake pedal and supplies the brake fluid pressure to the wheel cylinder, a pump which draws brake fluid out of a reservoir for generating a brake fluid pressure, and an accumulator which stores the brake fluid pressure generated by the pump. A change-over valve is disposed between the master cylinder and the wheel cylinder to disconnect the wheel cylinder from the master cylinder during its non-operational condition and to connect the wheel cylinder to the master cylinder during its operational condition A fluid conduit connects the accumulator to the wheel cylinder during the non-operational condition of the change-over valve, and a regulator is disposed on the fluid conduit to regulate the fluid pressure in the accumulator according to the amount of brake pedal operation. The accumulator includes a hollow case having an interior, a dividing member which divides the cylinder into a gas chamber which stores gas and a fluid chamber in which the brake fluid pressure generated by the pump is stored, and an open air chamber disposed on the dividing member.

According to another aspect of the invention, a brake control device for a vehicle includes a wheel cylinder mounted on the wheel of a vehicle, a master cylinder for generating a brake fluid pressure based on the amount of operation of the brake pedal and for supplying the brake fluid pressure to the wheel cylinder, a pump for drawing out brake fluid from a reservoir and for generating a brake fluid pressure, and an accumulator for storing the brake fluid pressure generated by the pump. The accumulator includes a case having an interior, a dividing member dividing the interior of the case into a gas chamber for storing a gas and a fluid chamber into which the fluid pressure generated by the pump is stored, and an open air chamber disposed on the dividing member and in communication with the atmosphere. A change-over valve is disposed between the master cylinder and the wheel cylinder to disconnect the wheel cylinder from the master cylinder when the change-over valve is in a non-operational condition and to connect the wheel cylinder to the master cylinder when the change-over valve is in an operational condition. A fluid conduit connects the accumulator to the wheel cylinder during the non-operational condition of the change-over valve.

In accordance with another aspect of the invention, a vehicle brake control device includes a wheel cylinder mounted on a vehicle wheel, a master cylinder for generating a brake fluid pressure based on an amount of operation of a brake pedal and for supplying the brake fluid pressure to the wheel cylinder, a pump for drawing out brake fluid in a reservoir and for generating a brake fluid pressure, and an accumulator which stores the brake fluid pressure generated by the pump. The accumulator includes a case having an interior, a dividing member dividing the interior of the case into a gas chamber for storing a gas and a fluid chamber into which the fluid pressure generated by the pump is stored, and a mechanism formed in the dividing member for allowing gas escaping from the gas chamber towards the fluid chamber to be discharged outside the accumulator.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
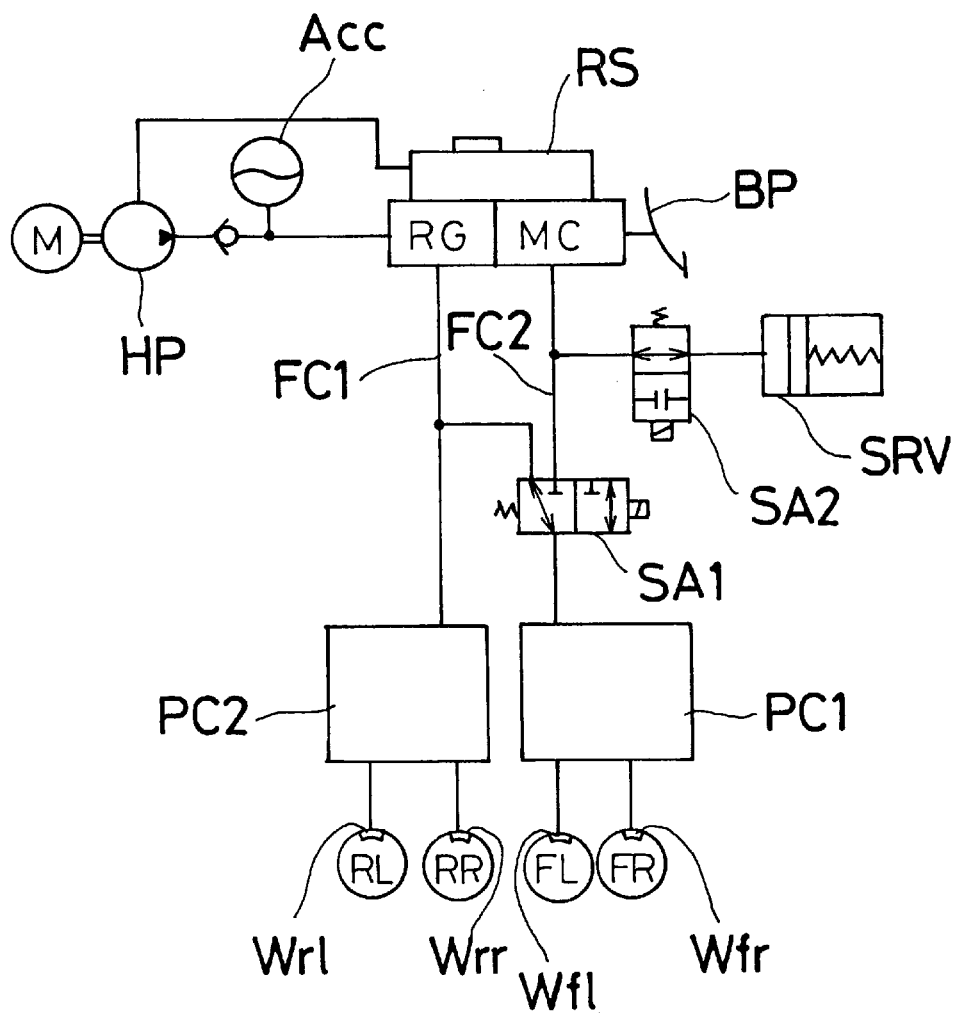
FIG. 1 is a schematic view of the vehicle brake control device according to a first embodiment of the present invention.

As seen with reference to FIG. 1, a brake pedal BP is connected to a master cylinder MC and a regulator RG, with the master cylinder MC and the regulator RG being operated according to the amount of operation of the brake pedal BP. An accumulator Acc is connected to the regulator RG and to a reservoir RS through a hydraulic pump HP. The hydraulic pump HP is driven by an electric motor M to absorb brake fluid in the reservoir RS and generate a brake fluid pressure. The fluid pressure generated by the hydraulic pump HP is stored in the accumulator Acc.

The electric motor M is driven in response to a decrease of the fluid pressure in the accumulator Acc below a first predetermined value and stops driving in response to an increase of the fluid pressure in the accumulator Acc above a second predetermined value.

The accumulator Acc supplies fluid pressure (power fluid pressure) to the regulator RG at appropriate times. The regulator RG receives the fluid pressure from the accumulator Acc to regulate the fluid pressure according to the fluid pressure generated by the master cylinder MC. The fluid pressure regulated by the regulator RG is used for boosting the master cylinder MC. The regulator RG is formed with a spool valve or a poppet valve.

The master cylinder MC is connected to the front right wheel cylinder Wfr which is mounted on a front right wheel FR and is connected to the front left wheel cylinder Wfl through an electromagnetic change-over valve SA1 and a first fluid pressure control device PC1.

The electromagnetic change-over valve SA1 selectively connects the first fluid pressure control device PC1 and the front wheel cylinders Wfr, Wfl to the master cylinder MC or the regulator RG. In the non-operational state, the electromagnetic change-over valve SA1 is positioned at a first position to cut off the front wheel cylinders Wfr, Wfl and the first fluid pressure control device PC1 from the master cylinder MC while connecting the front wheel cylinders Wfr, Wfl and the first fluid pressure control device PC1 to the regulator RG through a first fluid conduit FC1.

On the other hand, in the operational condition, the electromagnetic change-over valve SA1 is positioned at a second position to cut off the front wheel cylinders Wfr, Wfl and the first fluid pressure control device PC1 from the regulator RG and to connect the front wheel cylinders Wfr, Wfl and the first fluid pressure control device PC1 to the master cylinder MC through a second fluid conduit FC2 when the accumulator Acc malfunctions.

A portion of the second fluid conduit FC2 between the master cylinder MC and the electromagnetic change-over valve SA1 is connected to a static reservoir SRV through a normally-opened type electromagnetic valve SA2. The static reservoir SRV stores brake fluid according to the amount of operation of the brake pedal BP to thereby function as a brake pedal simulator when the electromagnetic change-over valve SA1 is positioned at the first position. Therefore, an uncomfortable brake pedal feeling caused by a lack of a brake pedal stroke is prevented.

The electromagnetic valve SA2 interacts with or is operatively associated with the electromagnetic change-over valve SA1 so that the electromagnetic valve SA2 is closed when the electromagnetic change-over valve SA1 is switched from the first position to the second position. Therefore, the master cylinder MC is able to supply brake fluid to the front wheel cylinders Wfr, Wfl when the accumulator Acc malfunctions.

The regulator RG is connected to the rear wheel cylinders Wrr, Wrl through a second fluid pressure control device PC2. Each of the first and second fluid pressure control devices PC1, PC2 is formed with a normally opened type electromagnetic valve and a normally-closed type electromagnetic valve which are conventional. In accordance with this construction, the first and second fluid pressure control devices PC1, PC2 can increase, decrease and maintain the fluid pressure in the wheel cylinders Wfr, Wfl, Wrr and Wrl to perform anti-skid control, front-rear braking force distribution control and the like.

Figure 2:
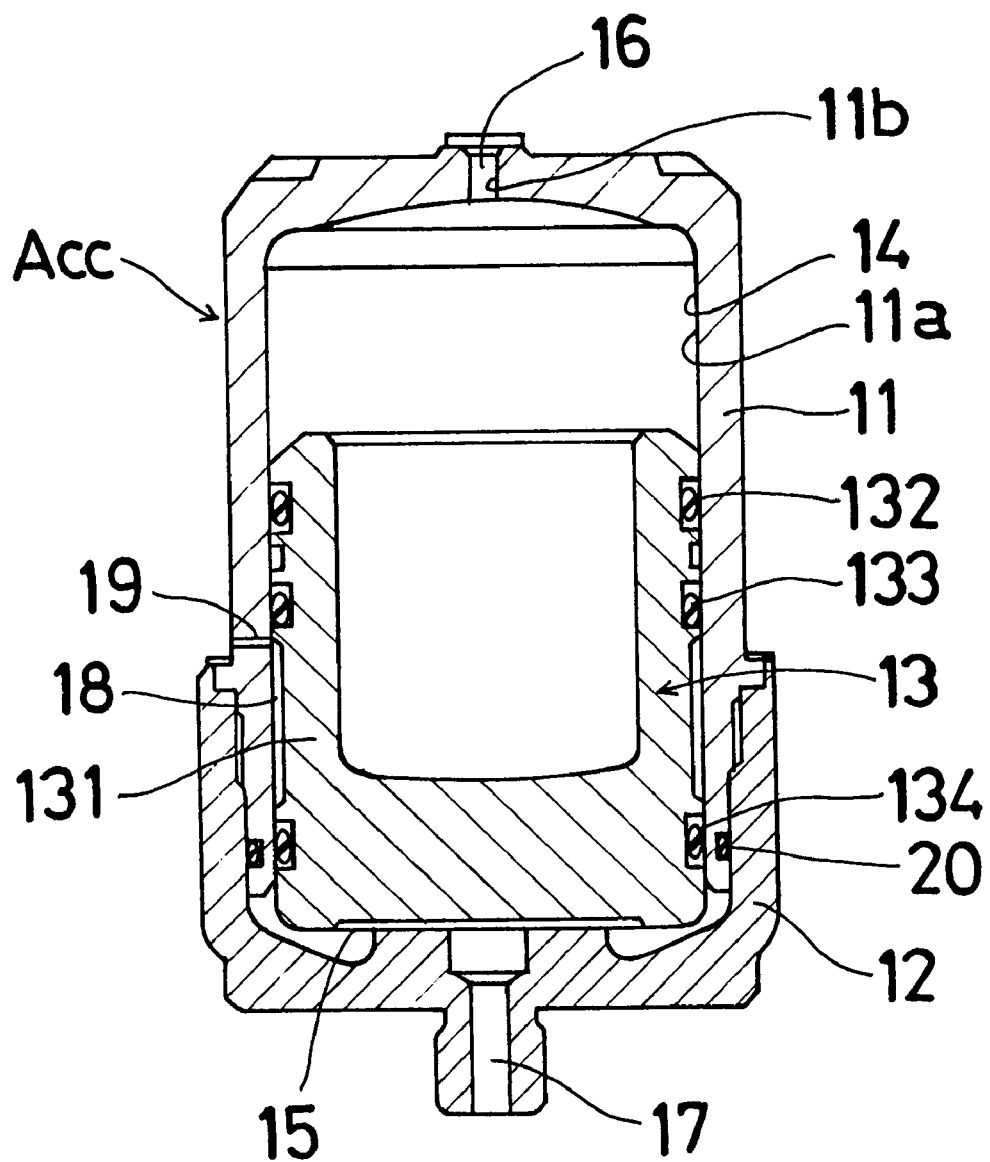
FIG. 2 is an enlarged cross-sectional view of the accumulator forming a part of the vehicle brake control device shown in FIG. 1.

As shown in FIG. 2, the accumulator Acc includes a cylindrical outer case 11 in which is defined an interior or a cylinder 11a. The accumulator Acc is also open at one end. A cap 12 is fixed at the one end of the outer case 11 to close the open end of the outer case 11. A dividing member 13 is slidably disposed in the interior 11a of the case 11 to divide the cylinder 11a in a fluid-tight manner into a gas chamber 14 and a brake fluid chamber 15.

The dividing member 13 is in the form of a piston 131 having seal rings 132, 133, 134 which are disposed between the piston 131 and the inner wall surface of the interior 11a of the outer case 11. High pressure nitrogen gas is introduced into the gas chamber 14, whereupon a gas hole 11b is closed by a stopper 16.

The brake fluid chamber 15 for storing the fluid pressure generated by the hydraulic pump HP is connected to the hydraulic pump HP through a passage 17 formed on the cap 12.

Each of the seal rings 132, 133 is made of a gas resistant material (e.g. a butyl rubber). The seal ring 134 is made of a material that is resistant to the brake fluid (e.g. EPDM). Further, a supplemental seal ring 20 is disposed between the outer case 11 and the cap 12.

An annular recess is formed in the outer surface of the piston 131 to form an annular open air chamber 18 that is disposed between the seal rings 133, 134. The open air chamber 18 is connected to the atmosphere through an air passage 19 formed in the outer case 11. A one-way valve, a relief valve or a filter for permitting only the discharge of gas may be disposed in the air passage 19 to prevent a foreign substance from entering the open air chamber 18.

Although the dividing member 13 is described as being in the form of a piston provided with sealing rings, the dividing member can be replaced with two diaphragms to divide the interior 11a of the outer case 11 in a fluid-tight manner into the gas chamber, the open air chamber and the brake fluid chamber.

With the above construction of the present invention, when the brake pedal BP is operated, the fluid pressure output by the accumulator Acc is regulated by the regulator RG according to the amount of operation or depression of the brake pedal BP. The regulated fluid pressure from the regulator RG is supplied to the front wheel cylinders Wfr, Wfl through the first fluid pressure control device PC1 and to the rear wheel cylinders Wrr, Wrl through the second fluid pressure control device PC2 to thereby apply brake forces to the wheels FR, FL, RR and RL.

When a part of the gas in the gas chamber 14 of the accumulator Acc leaks in the open air chamber 18 through the seal rings 132, 133, the leaked gas in the open air chamber 18 is discharged to the atmosphere through the air passage 19. Therefore, the gas in the gas chamber 14 is prevented from going into the brake fluid chamber 15. Consequently, the gas in the accumulator Acc is prevented from going into the wheel cylinders Wfr, Wfl, Wrr and Wrl through the regulator RG.

When the accumulator Acc malfunctions, the electromagnetic change-over valve SA1 is operated to be positioned at the second position and the electromagnetic valve SA2 is closed. Therefore, the master cylinder MC supplies brake fluid to the front wheel cylinders Wfr, Wfl to thereby apply the brake force to the front wheels FR, FL because the front wheel cylinders Wfr, Wfl are connected to the master cylinder MC.

Figure 3:
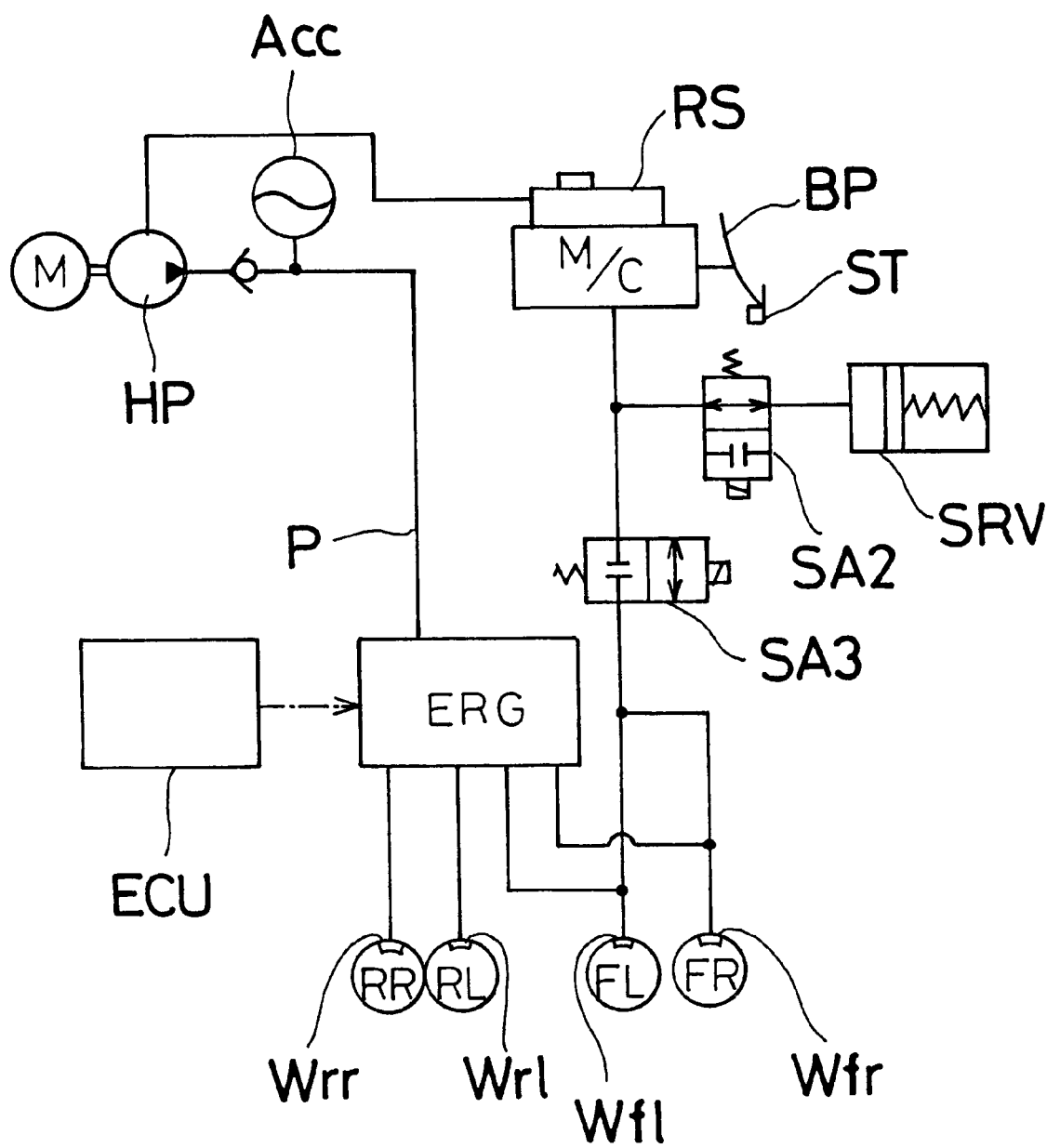
FIG. 3 is a schematic view of the vehicle brake control device according to a second embodiment of the present invention.

A second embodiment of the vehicle brake control device is shown in FIG. 3. In this second embodiment, the master cylinder MC is connected to the front wheel cylinders Wfr, Wfl through a normally-closed type electromagnetic valve SA3. When the accumulator Acc malfunctions, the electromagnetic valve SA3 is opened to connect the front wheel cylinders Wfr, Wfl to the master cylinder MC.

The accumulator Acc is connected to the front wheel cylinders Wfr, Wfl through a fluid conduit P. An electric regulator ERG is disposed on the fluid conduit P. The electric regulator ERG is also connected to the rear wheel cylinders Wrr, Wrl. The electric regulator ERG is electrically connected to a controller ECU. The controller ECU controls the electric regulator ERG so that the electric regulator ERG generates a fluid pressure which is several times as large as the fluid pressure that is based on the amount of depression of the brake pedal operation. The amount of operation or depression of the brake pedal is based on a detecting signal from a brake pedal stroke sensor ST which detects the operational stroke of the brake pedal BP.

Further, the controller ECU is adapted to perform anti-skid control, frontrear braking force distribution control, traction control, oversteer restraining control, understeer restraining control and the like.

The construction of the accumulator Acc shown in the embodiment of FIG. 3 is the same as the construction shown in FIG. 2. Thus, gas in the gas chamber 14 of the accumulator Acc is prevented from going into the wheel cylinders Wfr, Wfl, Wrr and Wrl through the electric regulator ERG.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A brake control device for a vehicle comprising:
   a wheel cylinder mounted on a wheel of a vehicle;
   a master cylinder for generating a fluid pressure of brake fluid based on an amount of operation of a brake pedal and for supplying the fluid pressure to the wheel cylinder;
   a pump for drawing out brake fluid in a reservoir and for generating a fluid pressure of the brake fluid;
   an accumulator for storing the fluid pressure generated by the pump, the accumulator including a case having an interior, a dividing member dividing the interior of the case into a gas chamber for storing a gas and a fluid chamber into which the fluid pressure generated by the pump is stored, and an open air chamber disposed on the dividing member;
   a change-over valve disposed between the master cylinder and the wheel cylinder to disconnect the wheel cylinder from the master cylinder when the change-over valve is in a non-operational condition and to connect the wheel cylinder to the master cylinder when the change-over valve is in an operational condition;
   a fluid conduit connecting the accumulator to the wheel cylinder during the non-operational condition of the change-over valve; and
   a regulator disposed on the fluid conduit for regulating the fluid pressure in the accumulator according to an amount of operation of the brake pedal.

2. A brake control device according to claim 1, including an electromagnetic valve disposed between the master cylinder and the change-over valve, and a static reservoir connected to the electromagnetic valve.

3. A brake control device according to claim 1, including a fluid pressure control device disposed between the change-over valve and the wheel cylinder.

4. A brake control device according to claim 1, including at least one seal disposed between the dividing member and an inner wall surface of the case at a position between the gas chamber and the open air chamber.

5. A brake control device according to claim 1, wherein the open air chamber is an annular recess formed in an outer surface of the dividing member which is connected to the atmosphere by an air passage formed in the case.

6. A brake control device according to claim 1, wherein the regulator is an electric regulator.

7. A brake control device for a vehicle comprising:
   a wheel cylinder mounted on a wheel of a vehicle;
   a master cylinder for generating a brake fluid pressure based on an amount of operation of a brake pedal and for supplying the brake fluid pressure to the wheel cylinder;
   a pump for drawing out brake fluid from a reservoir and for generating a brake fluid pressure;
   an accumulator for storing the brake fluid pressure generated by the pump, the accumulator including a case having an interior, a dividing member dividing the interior of the case into a gas chamber for storing a gas and a fluid chamber into which the fluid pressure generated by the pump is stored, and an open air chamber disposed on the dividing member and in communication with the atmosphere;
   a change-over valve disposed between the master cylinder and the wheel cylinder to disconnect the wheel cylinder from the master cylinder when the change-over valve is in a non-operational condition and to connect the wheel cylinder to the master cylinder when the change-over valve is in an operational condition;

a fluid conduit connecting the accumulator to the wheel cylinder during the non-operational condition of the change-over valve.

8. A brake control device according to claim 7, wherein the regulator is an electric regulator.

9. A brake control device according to claim 7, including at least one seal disposed between the dividing member and an inner wall surface of the case at a position between the gas chamber and the open air chamber.

10. A brake control device according to claim 9, including a regulator positioned between the accumulator and the wheel cylinder.

11. A brake control device according to claim 7, including an electromagnetic valve disposed between the master cylinder and the change-over valve, and a static reservoir connected to the electromagnetic valve.

12. A brake control device for a vehicle comprising:

a wheel cylinder mounted on a wheel of a vehicle;

a master cylinder for generating a brake fluid pressure based on an amount of operation of a brake pedal and for supplying the brake fluid pressure to the wheel cylinder;

a pump for drawing out brake fluid in a reservoir and for generating a brake fluid pressure;

an accumulator for storing the brake fluid pressure generated by the pump, the accumulator including a case having an interior, a dividing member dividing the interior of the case into a gas chamber for storing a gas and a fluid chamber into which the fluid pressure generated by the pump is stored, and means formed in the dividing member for allowing gas escaping from the gas chamber towards the fluid chamber to be discharged outside said accumulator.

13. A brake control device according to claim 12, wherein the means for allowing gas escaping from the gas chamber towards the fluid chamber to be discharged outside the accumulator includes an annular recess formed in the dividing member which communicates with an air passage formed in the case that opens to the atmosphere.

14. A brake control device according to claim 12, including at least one seal disposed between the dividing member and an inner wall surface of the case at a position between the gas chamber and said means.

15. A brake control device according to claim 12, including a regulator located between the accumulator and the wheel cylinder.

16. A brake control device according to claim 12, including a changeover valve positioned in a conduit extending between the master cylinder and the wheel cylinder, said change-over valve being movable between a non-operational position in which the wheel cylinder is disconnected from the master cylinder and an operation position in which the wheel cylinder is connected to the master cylinder.

* * * * *